United States Patent [19]

DeMarco

[11] Patent Number: 4,478,265

[45] Date of Patent: Oct. 23, 1984

[54] REUSABLE INSULATING JACKET FOR BEVERAGE CONTAINERS

[75] Inventor: David DeMarco, Austin, Tex.

[73] Assignee: Cool-Zip Inc., Austin, Tex.

[21] Appl. No.: 459,259

[22] Filed: Jan. 19, 1983

Related U.S. Application Data

[63] Continuation-in-part of Ser. No. 305,893, Sep. 25, 1981.

[51] Int. Cl.³ .............................................. B65D 23/08
[52] U.S. Cl. ............................... 150/52 R; 215/13 R; 220/85 H; 220/410; 220/412
[58] Field of Search ............. 220/410, 412, 902, 85 H; 150/52 R, 55; 215/13 R; 229/5.5; 383/66

[56] References Cited

U.S. PATENT DOCUMENTS

| 866,236 | 9/1907 | Stout | 229/5.5 |
|---|---|---|---|
| 1,581,535 | 4/1926 | Granger | 150/52 R |
| 2,376,194 | 5/1945 | Samuels | 150/52 R |
| 3,313,333 | 4/1967 | Lordi | 150/52 R |
| 3,905,511 | 9/1975 | Groendal | 220/902 |
| 3,906,129 | 9/1975 | Damois | 220/902 |
| 3,952,847 | 4/1976 | Via | 383/66 |

Primary Examiner—George E. Lowrance
Attorney, Agent, or Firm—Roylance, Abrams, Berdo & Goodman

[57] ABSTRACT

A reusable insulating jacket for beverage containers includes a housing having a cylindrical side wall of flexible insulating material defining an internal cavity for receiving a beverage container. An elongated slit is formed in the side wall which extends the entire height of the side wall and is defined between edges of the side wall. An elongated, openable fastener, such as a zipper, is attached to the side wall edges for selectively opening and closing the slit to facilitate insertion and removal of a beverage container from the cavity in the side wall.

12 Claims, 4 Drawing Figures

REUSABLE INSULATING JACKET FOR BEVERAGE CONTAINERS

CROSS-REFERENCE TO RELATED APPLICATION

This application is a continuation-in-part of U.S. patent application Ser. No. 305,893, filed Sept. 25, 1981 and entitled "Reusable Insulating Jacket for Beverage Containers".

The invention relates to a reusable insulating jacket for beverage containers.

BACKGROUND OF THE INVENTION

Conventional insulating jackets or holders for single cold beverage containers, such as cans and bottles are formed of vinyl or polyurethane tubing originally designed for pipe insulation, or of foamed polystyrene which is usually rather rigid and which is sometimes provided with an end ring of a more flexible material having a lip which contacts the container. Although these materials provide good insulation, insertion and removal of the beverage container into and from the jacket is difficult. The difficulty in removing and inserting the beverage container results from the relatively high coefficient of friction between the container and jacket material, the pressure pocket developed when the container is inserted into the jacket and the suction created when the container is withdrawn from the jacket. Where the container has been retained within a conventional jacket for a period of time sufficient to allow the condensation on the container to dry, the jacket material tends to adhere to the container and to cause damage to the jacket upon removal of the container from the jacket.

Conventional insulating jackets for beverage containers are disclosed in U.S. Pat. No. 3,603,106 to Ryan, No. 3,743,130 to Jorgensen and No. 3,905,511 to Groendal. The Ryan and Jorgensen patents disclose cylindrical jackets which do not have means for opening the side wall of the jacket to facilitate insertion and removal of the container. The Groendal patent discloses a jacket having hingedly coupled upper and lower sections to provide a closed-top jacket for the container.

U.S. Pat. No. 3,906,192 to Damois discloses an insulating cover for a water heater. The cover comprises a multilayer material and has a zipper joining two cover sections to facilitate mounting of the cover about a water heater. The cover of the Damois patent is not adapted nor suitable for use with beverage containers.

BRIEF DESCRIPTION OF THE INVENTION

An object of the present invention is to provide an improved insulating jacket for beverage containers which may be reused.

Another object of the present invention is to provide a reusable insulating jacket for beverage containers in which beverage containers can be simply and quickly inserted into and removed from the jacket.

A further object of the present invention is to provide a reusable insulating jacket of rugged construction which is simple and inexpensive to manufacture.

Other objects, advantages and salient features of the present invention will become apparent from the following detailed description of a preferred embodiment of the invention.

Briefly described, the invention includes a reusable insulating jacket for beverage containers having a housing with an elongated slit and an openable, elongated fastener for opening and closing the slit. The housing has a cylindrical side wall of flexible insulating material formed about an axis and defining a cylindrical cavity inside the side wall for receiving a beverage container. The elongated slit is formed in the side wall such that it extends the entire height of the side wall with the slit defined by edges of the side wall. The fastener means is attached to the side wall edges for selectively opening and closing the slit to facilitate insertion and removal of a beverage container into and from the cavity within the side wall. A bottom plate of flexible insulating material is fixed to a bottom end of the side wall, and has a generally circular portion bounded by the side wall and a radial extension projecting from the circular portion and fixed to the side wall edges.

By constructing the reusable insulating jacket of the present invention in this manner, a beverage container may be inserted within and removed from the jacket quickly and simply. When the fastener is opened permitting separation of the side wall edges and opening of the slit, the beverage container can be easily and quickly inserted into and removed from the jacket. Since the slit and fastener means extend the entire height of the side wall, there is no pocket of air trapped between the beverage container bottom and the bottom of the jacket making insertion difficult and no suction results during removal of the container hindering withdrawal of the container from the jacket. Moreover, the resilient and flexible nature of the side walls and of the slit permit the side walls to be peeled away from the container so that the container may be removed even after condensation on the container has dried and has caused the friction between the container and the jacket to be increased.

Additionally, the construction of the container is facilitated. The side wall may be formed from a rectangular piece of insulating material which is rolled into a cylindrical shape and retained in the cylindrical shape by the fastener means.

The bottom plate comprising a circular portion and radial extension fixed between the side wall edges spaces the side wall edges permitting free sliding movement of the fastener without contacting the flexible insulating material, provides a solid bottom preventing release of condensation through the bottom of the jacket, adds to the support of the fastener bottom, and facilitates manufacture by providing glue areas at and spacing the bottom ends at the side wall edges. The bottom place configuration of the present invention is an improvement over the circular bottom plate disclosed in U.S. patent application Ser. No. 305,893 since the circular bottom plate does not have the radial extension of the present invention and the four advantages provided thereby.

The fastener means can comprise a zipper. With the slit arranged parallel to the axis of the cylindrical side wall, a minimum length of zipper is required. Support members can be fixed to the side walls and to the fastener means to make the fastener means more secure and prevent tearing of the insulation material by repeated operation of the fastener. A large pull ring can be provided on the fastener means to permit the jacket to be attached to other devices to prevent loss or theft.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of the specification, and wherein.

DETAILED DESCRIPTION OF THE PREFERRED EMBODIMENT OF THE INVENTION

Figure 1:
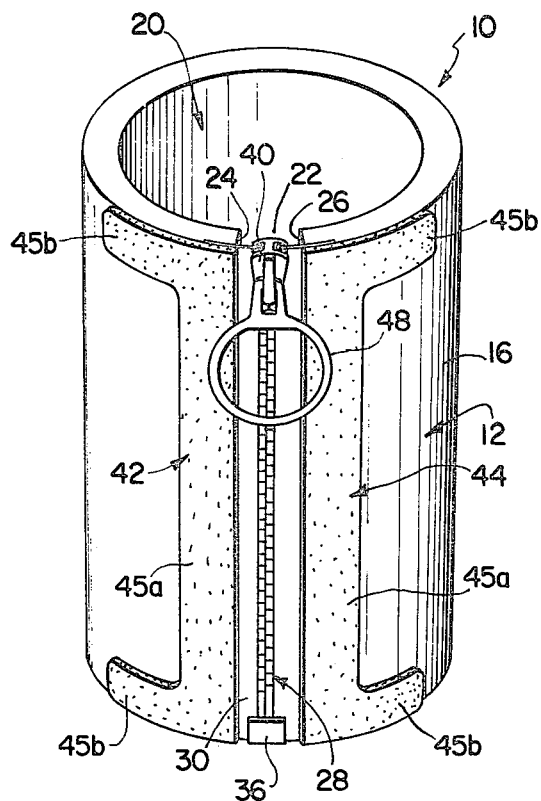
FIG. 1 is perspective view illustrating a reusable insulating jacket in accordance with the present invention.
Figure 2:
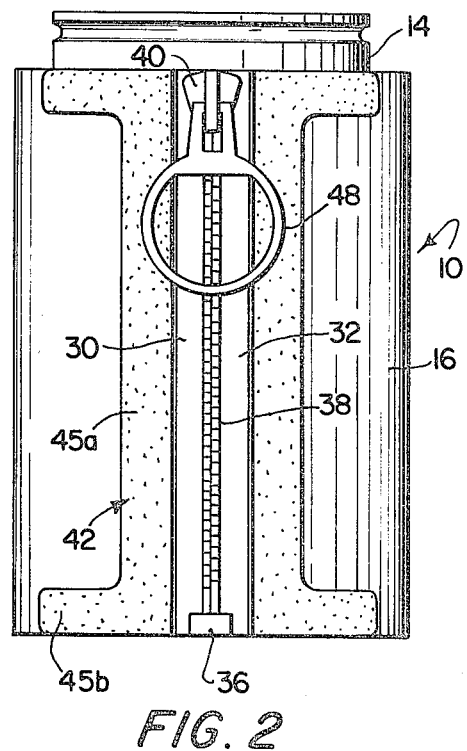
FIG. 2 is a side elevational view of the reusable reinsulating jacket of FIG. 1 with a beverage container housed therein.
Figure 3:
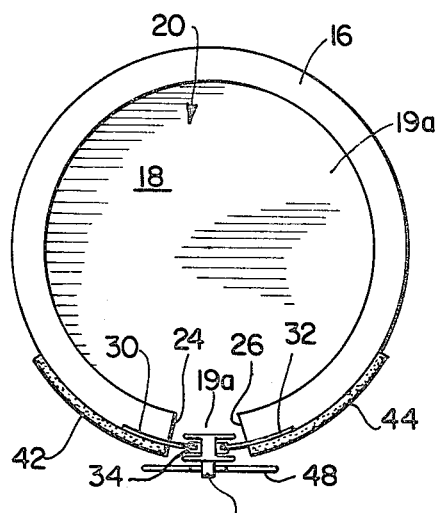
FIG. 3 is a top plan view of the reusable insulating jacket of FIG. 1.
Figure 4:
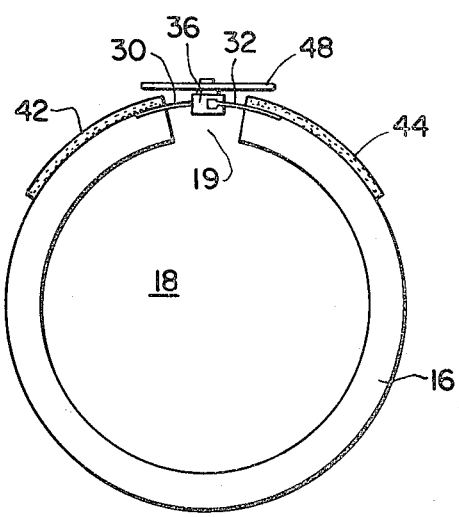
FIG. 4 is a bottom plan view of the reusable insulating jacket of FIG. 1.

Referring to FIGS. 1-4, the reusable insulating jacket 10 of the present invention comprises a housing 12 in which a beverage container 14 may be placed. The housing comprises a cylindrical side wall 16 and a bottom plate or wall 18. Both the side wall and bottom plate are formed of like material comprising a flexible, soft, resilient, elastomeric foam material which enables the housing parts to flex and to insulate the container housed within the jacket.

Side wall 16 is formed from a rectangular piece of insulating material which is bent to form a cylinder defining the cylindrical internal cavity 20 for receiving container 14. Typically, the side wall is four and one-half inches high and is of sufficient size to define internal cavity 20 with a diameter of approximately two and one-half inches.

Bottom plate 18 is generally key-hole shaped with a generally circular portion 19a, typically having a diameter of two and one-half inches and a radial extension 19b projecting from the circular portion. The side wall and bottom plate are fixed together by a suitable adhesive such that the side wall surrounds the perimeter of the circular portion of the bottom plate. The size of the side wall and bottom plate can be varied depending on the configuration and size of the container to be received in the jacket.

In forming side wall 16 from a rectangular piece of material, an elongated slit 22 is formed in the side wall by the edges 24,26 of the rectangular piece which are brought together. Slit 22 extends the entire height of the side wall and is parallel to the axis of the cylinder defined by the side wall. In this manner, slit 22 extends entirely through side wall 16. The lower ends of edges 24,26 are adhered to the vertical sides of extension 19b such that the extension underlies slit 22 and closes its lower end.

Side wall edges 24,26 are releasably or detachably coupled by a zipper assembly 28. Preferably, this zipper assembly is formed of a suitable synthetic material, e.g., nylon, to minimize costs and prevent corrosion resulting from moisture. The zipper assembly comprises a chain of teeth 38 attached to tapes 30 and 32 which are fixedly attached to support members 42 and 44, respectively, and to the outer surfaces of side wall 16 adjacent edges 24,26, respectively. The top end piece 34 of the zipper is located at the top of the slit, while the bottom end piece 36 is located at the bottom of slit 22. The engagement and disengagement of the chain of teeth 38 is controlled by up and down movement of the slide 40.

Support members 42,44 which are fixed on the outer surface of side wall 16 adjacent slit 22 are formed of vinyl or a similar type of material. The support members are glued to the exterior surface of side wall 16 and to tapes 30,32 of zipper assembly 28. In this manner, support members 42,44 strengthen the connection between zipper assembly 28 and side wall 16 to prevent separation, as well as providing decorative ornamentation for jacket 10. Each support member is generally U-shaped with a base portion 45a extending along edges 24,26 and legs 45b extending along the upper and lower edges of the side wall.

A large ring 48 is coupled to slide 40 of zipper assembly 28. This ring facilitates manipulation of slide 40. Additionally, the ring permits the jacket to be attached to other objects, e.g., car keys, belt loops, etc. to insure against loss or theft of the jacket.

By forming jacket 10 in this manner, zipper assembly 28 may be opened to open slit 22 to facilitate insertion and removal of container 14 into and from jacket 10. During insertion, air trapped between jacket 10 and container 14 can be exhausted through slit 22 during the full insertion of container 14 since slit 22 extends along the entire height of side wall 16. This arrangement also permits air to pass through slit 22 and into cavity 20 during removal of the container to prevent the formation of a volume of reduced pressure between jacket 10 and container 14 which will increase the difficulty of removal. Additionally, when the zipper slide 40 is in its lowermost position fully opening slit 22, side wall 16 may be peeled from a container to be removed from jacket 10 even if the condensation formed on container 14 had dried.

Bottom plate 18 comprising circular portion 19a and radial extension 19b fixed between side wall edges 24,26 spaces the side wall edges permitting free sliding movement of zipper slide 40 without contacting the flexible insulating material, provides a solid bottom preventing release of condensation through the bottom of the jacket, adds to the support of zipper bottom end piece 36, and facilitates manufacture by providing glue areas at the bottom ends of and properly spacing the side wall edges.

The connection of zipper assembly 28 to side wall 16 with support members 42,44 enhances the integrity of the construction and extends the useful life of jacket 10 by preventing separation of zipper assembly 28 from side wall 16.

While one advantageous embodiment has been chosen to illustrate the invention, it will be understood by those skilled in the art that various changes and modifications can be made therein without departing from the scope of the invention as defined in the appended claims.

What is claimed is:

1. A reusable insulating jacket for beverage containers, comprising:
   a housing having a cylindrical side wall of flexible insulating material formed about an axis and defining a cylindrical cavity therein for receiving a beverage container;
   an elongated slit formed in said side wall extending the entire height of said side wall, said slit being defined between edges of said side wall; openable, elongated fastener means attached to said side wall edges for selectively opening and closing said slit to facilitate insertion and removal of a beverage container into and from said cavity; and a bottom plate of flexible insulating material fixed to a bottom end of said side wall, said bottom plate having a substantially circular portion with a periphery bounded by said side wall and a radial extension projecting from said periphery of said circular portion, said radial extension being fixed to and between said edges of said side wall.

2. A reusable insulating jacket according to claim 1, wherein said fastener means comprises a slide fastener.

3. A reusable insulating jacket according to claim 2, wherein said slide fastener is a zipper.

4. A reusable insulating jacket according to claim 1, wherein said slit extends parallel to said axis.

5. A reusable insulating jacket according to claim 1, wherein said circular portion is fixed to an interior surface of said side wall by adhesive.

6. A reusable insulating jacket according to claim 1, wherein support members are fixed to said side wall adjacent said edges and to said fastener means.

7. A reusable insulating jacket according to claim 6, wherein said support members are fixed to said fastener means by adhesive.

8. A reusable insulating jacket according to claim 6, wherein said support members cover only a portion of said side wall adjacent said slit.

9. A reusable insulating jacket according to claim 8, wherein each of said support members are U-shaped with a base portion extending along said slit and legs along upper and lower edges of said side wall.

10. A reusable insulating jacket according to claim 1, wherein said fastener means includes a large pull ring.

11. A reusable insulating jacket according to claim 1, wherein said insulating material is a soft, resilient elastomeric foam.

12. A reusable insulating jacket for beverage containers, comprising:
a housing of soft, resilient, elastomeric foam material having a cylindrical side wall formed about an axis and defining a cylindrical cavity for receiving a beverage container;
an elongated slit formed in said side wall extending the entire height of said side wall and parallel to said axis, said slit being defined between opposed edges of said side wall;
a bottom plate of flexible insulating material fixed to a bottom end of said side wall, said bottom plate having a substantially circular portion with a periphery bounded by said side wall and a radial extension projecting from said periphery of said circular portion, said circular portion being fixed to an interior surface of said side wall by adhesive, said radial extension being fixed to and between said edges of said side wall;
a zipper attached to said side wall edges for selectively opening and closing said slit to facilitate insertion and removal of a container into and from said cavity; and
support members fixed to said side wall adjacent said edges and to said zipper by adhesive.

* * * * *